US011763467B2

(12) United States Patent
Tong et al.

(10) Patent No.: US 11,763,467 B2
(45) Date of Patent: Sep. 19, 2023

(54) MULTI-CAM BALL LOCATION METHOD AND APPARATUS

(71) Applicant: INTEL CORPORATION, Santa Clara, CA (US)

(72) Inventors: Xiaofeng Tong, Beijing (CN); Chen Ling, Beijing (CN); Ming Lu, Beijing (CN); Qiang Li, Beijing (CN); Wenlong Li, Beijing (CN); Yikai Fang, Beijing (CN); Yumeng Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/255,837

(22) PCT Filed: Sep. 28, 2018

(86) PCT No.: PCT/CN2018/108189
§ 371 (c)(1),
(2) Date: Dec. 23, 2020

(87) PCT Pub. No.: WO2020/061986
PCT Pub. Date: Apr. 2, 2020

(65) Prior Publication Data
US 2021/0279896 A1    Sep. 9, 2021

(51) Int. Cl.
*G06T 7/70* (2017.01)
*G06T 7/292* (2017.01)
(Continued)

(52) U.S. Cl.
CPC .............. *G06T 7/292* (2017.01); *G06F 18/22* (2023.01); *G06T 7/215* (2017.01); *G06T 7/70* (2017.01);
(Continued)

(58) Field of Classification Search
CPC .......... G06T 7/292; G06T 7/215; G06T 7/70; G06T 2207/20084; G06T 2207/30224;
(Continued)

(56) References Cited

U.S. PATENT DOCUMENTS

| 2003/0179294 A1* | 9/2003 | Martins | G06T 7/292 |
| | | | 348/157 |
| 2008/0192116 A1* | 8/2008 | Tamir | G06T 7/292 |
| | | | 348/157 |

(Continued)

FOREIGN PATENT DOCUMENTS

| CN | 101383910 A | 3/2009 |
| CN | 106296686 A | 1/2017 |

(Continued)

OTHER PUBLICATIONS

International Search Report and Written Opinion for International Patent Application No. PCT/CN2018/108189 dated Jul. 8, 2019, 10 pages.

(Continued)

*Primary Examiner* — Syed Haider
(74) *Attorney, Agent, or Firm* — Jordan IP Law, LLC

(57) ABSTRACT

A multi-camera architecture for detecting and tracking a ball in real-time. The multi-camera architecture includes network interface circuitry to receive a plurality of real-time videos taken from a plurality of high-resolution cameras. Each of the high-resolution cameras simultaneously captures a sports event, wherein each of the plurality of high-resolution cameras includes a viewpoint that covers an entire playing field where the sports event is played. The multi-camera architecture further includes one or more processors coupled to the network interface circuitry and one or more memory devices coupled to the one or more processors. The one or more memory devices includes instructions to determine the location of the ball for each frame of the plurality (Continued)

of real-time videos, which when executed by the one or more processors, cause the multi-camera architecture to simultaneously perform one of a detection scheme or a tracking scheme on a frame from each of the plurality of real-time videos to detect the ball used in the sports event and perform a multi-camera build to determine a location of the ball in 3D for the frame from each of the plurality of real-time videos using one of detection or tracking results for each of the cameras.

22 Claims, 11 Drawing Sheets

(51) Int. Cl.
*G06T 7/215* (2017.01)
*H04N 7/18* (2006.01)
*G06V 20/40* (2022.01)
*G06V 20/52* (2022.01)
*G06F 18/22* (2023.01)

(52) U.S. Cl.
CPC .............. *G06V 20/40* (2022.01); *G06V 20/52* (2022.01); *H04N 7/181* (2013.01); *G06T 2207/20084* (2013.01); *G06T 2207/30224* (2013.01)

(58) Field of Classification Search
CPC ...... G06V 20/52; G06V 20/40; G06V 10/761; G06V 30/19093; H04N 7/181; G06K 9/6215
See application file for complete search history.

(56) References Cited

U.S. PATENT DOCUMENTS

| | | | |
|---|---|---|---|
| 2009/0066784 A1 | 3/2009 | Stone et al. | |
| 2011/0090344 A1* | 4/2011 | Gefen | G06T 7/248 348/169 |
| 2014/0301600 A1 | 10/2014 | Marty et al. | |
| 2015/0178953 A1* | 6/2015 | Gao | G06T 11/00 345/681 |

FOREIGN PATENT DOCUMENTS

| | | |
|---|---|---|
| CN | 106488127 A | 3/2017 |
| CN | 107257494 A | 10/2017 |
| JP | 2016099941 A | 5/2016 |
| WO | 2014078068 A1 | 5/2014 |
| WO | 2015033546 A1 | 3/2015 |

OTHER PUBLICATIONS

S. Ren et al., "Faster R-CNN: Towards Real-Time Object Detection with Region Proposal Networks", Jan. 6, 2016, 3 pages.
P. Hu, "Finding Tiny Faces", Apr. 15, 2017, pp. 951-959.
R. Girshick et al., "Rich Feature Hierarchies for Accurate Object Detection and Semantic Segmentation", Oct. 22, 2014, 64 pages.
J. Redmon et al., "You Only Look Once: Unified, Real-Time Object Detection", May 9, 2016, 10 pages.
A. Van Etten, "You Only Look Twice: Rapid Multi-Scale Object Detection In Satellite Imagery", May 24, 2018, 8 pages.

* cited by examiner

MULTI-CAM BALL LOCATION METHOD AND APPARATUS

CROSS REFERENCE TO RELATED APPLICATIONS

The present application is a U.S. National Phase Patent Application, which claims the benefit of priority to International Patent Application No. PCT/CN2018/108189 filed on Sep. 28, 2018.

TECHNICAL FIELD

Embodiments generally relate to object detection in advanced visual analytics. More particularly, embodiments relate to a method and apparatus for detecting and tracking a ball using multiple super high-resolution cameras.

BACKGROUND

There are several challenges in multi-cam small ball location. First, the ball is quite small. When compared with the video frame size, the ball is approximately 25 pixels and the video frame is 5120×3072 pixels, amounting to a ratio of approximately 1/200. Second, the color or texture of the ball is poor due to its small size, video quality, motion blur, etc. And third, from the perspective of locating the ball in sport activities, the ball may be occluded by players.

Object detection methods may be categorized into two classes: general object detection and small size object detection. For general object detection, the ratio between object and image is approximately 1/12 to 1/2. General object detection methods may use CNNs to apply tens of layers to extract rich features. These methods cannot be applied for small size object detection. Current small size object detection methods may use a sliding window or image partition method to detect the object, but such methods only focus on resolving the general object location problem. They do not offer a full technical solution that allows the ball to be detected and tracked from multi-cam super high-resolution videos in real-time.

BRIEF DESCRIPTION OF THE DRAWINGS

The various advantages of the embodiments will become apparent to one skilled in the art by reading the following specification and appended claims, and by referencing the following drawings, in which:

Figure 1A:
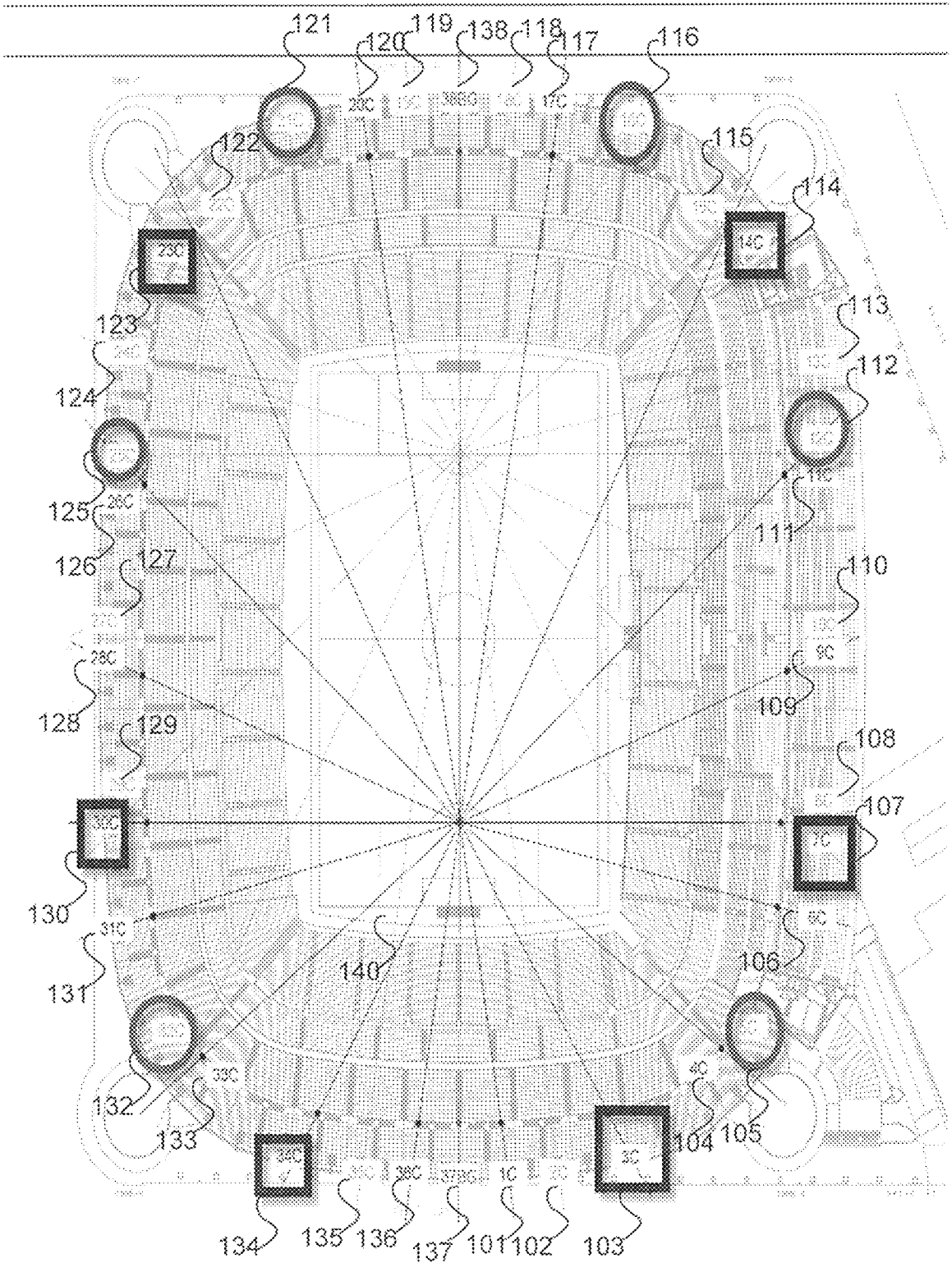
FIG. 1A is an example illustration of a stadium in which thirty-eight (38) physical cameras with 5120×3072 resolution are installed.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to provide an immersive media experience to end users in real-time for sporting events in which a single ball is the focus of a game, such as, for example, football, soccer, basketball, tennis, etc. Ball location plays a fundamental and critical part in sports analytic systems. Knowing the location of the ball in real-time can enable usages such as, for example, freeze moments in highlight detection, real-time virtual camera path control, high quality 3D (3-Dimensions) ball rendering, game tactics, performance statistics, and more.

Embodiments use a multiple camera (multi-cam) solution comprising approximately twelve (12) super-high resolution (5 k×3 k) cameras to cover an entire court or field of a sporting arena. The multi-cam solution is used to find the small ball with high accuracy and robustness. The multi-cam solution follows the action in the field or court by following the ball moving trajectory in 3D space. The system uses a multi-cam architecture that enables end-to-end ball detection and tracking-by-detection to then perform a multi-cam build that results in the final 3D ball location. To mitigate false and miss detections, the multi-cam architecture uses RANSAC (Random Sample Consensus) to keep the most reliable ball in each view using multi-cam cross validation, and then uses 3D triangulation and bundle adjustment to optimize the final 3D ball result.

In one embodiment, the ball detection method uses a customized object detection scheme, such as, for example, YOLO (You Only Look Once) detection scheme with image partition into tiles and motion-based filtering to detect a super-small ball with high accuracy and faster speed. In one embodiment, the ball tracking scheme uses tracking-by-detection to follow the ball moving trajectory in 3D space. The ball is detected in the tile in which the ball was located in the previous frame. Tracking the ball via detection on a single tile close to the ball location found in the previous frame greatly improves the speed and augments accuracy by using a multi-cam architecture in case the ball is not successfully detected in one particular camera.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Intel® TrueView, manufactured by Intel® Corporation, improves the sport viewer experience by giving the viewer the ability to immerse themselves into the action that occurs on a stadium field or on a court arena. This is accomplished by providing replays that show the action on the field or court from an angle that the viewer never would have been able to see. Intel® TrueView uses thirty-eight (38) super-high resolution (5 k×3 k) cameras to cover an entire sports stadium or arena.

Embodiments provide Intel® TrueView with the ability to immerse their viewers in a real-time viewpoint video experience that is full of excitement and fun. For example, embodiments will enable usages in Intel® TrueView, such as, for example, freeze moment in highlight detection, real-time virtual camera path control, high quality 3d ball rendering, game tactics and performance statistics, and more.

FIG. 1A is an example illustration of a stadium in which the thirty-eight (38) physical cameras with 5120×3072 resolution are installed. Each of the 38 cameras (referenced from 101 to 138) are strategically placed around the stadium to capture any action that occurs on a field 140 from any angle. Each camera (101 to 138) includes a server (not explicitly shown). To use all 38 cameras requires a very wide communication bandwidth and a great deal more computation resources. Thus, to provide an immersive media experience to end users in real-time, embodiments typically only utilize twelve (12) of the 38 cameras to detect and track the ball in real-time. With 12 cameras, the computation resources are less and the costs per server are reduced.

Figure 1B:
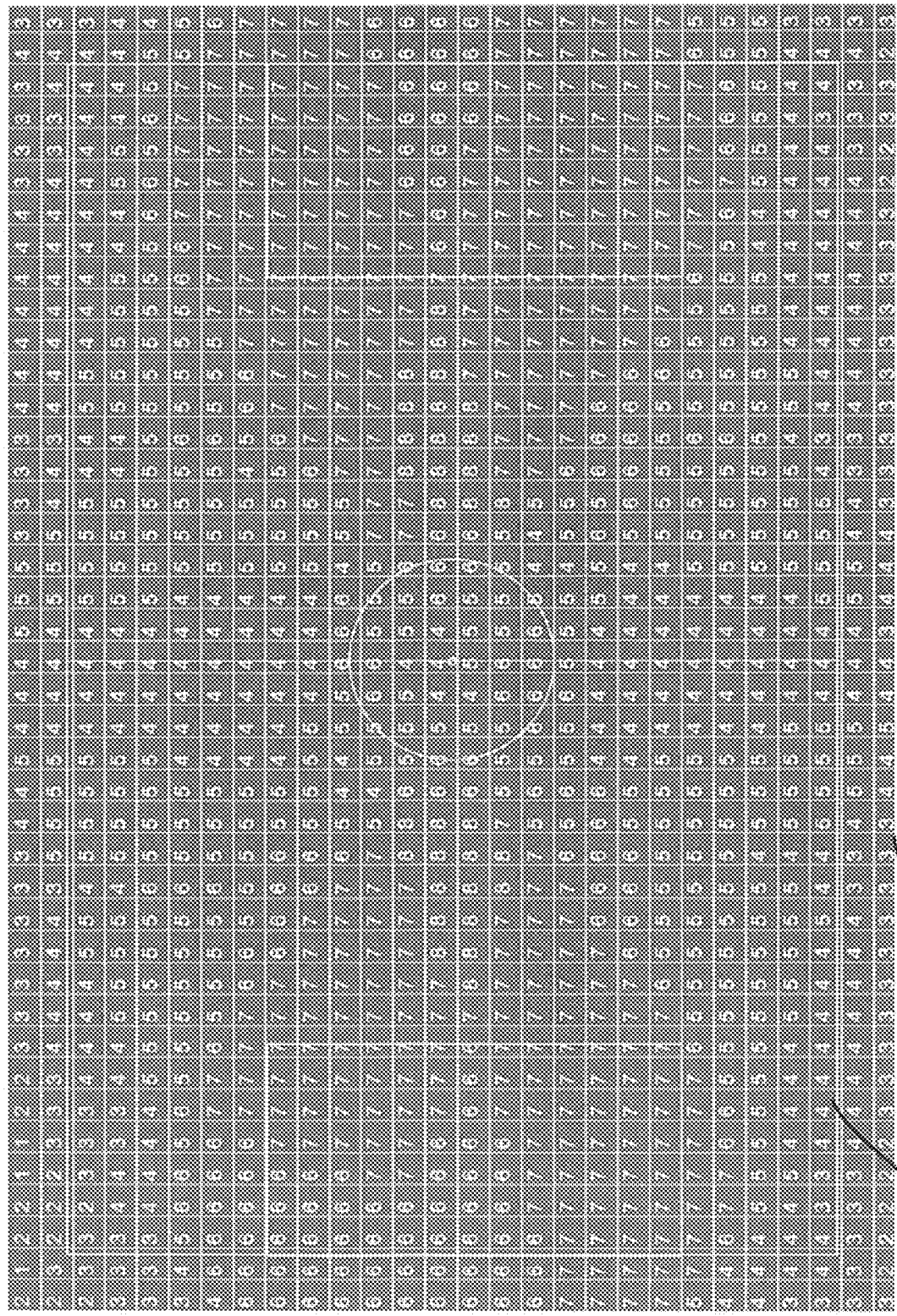
FIG. 1B illustrates a coverage map for 12 of 38 physical cameras in a stadium according to an embodiment.

The field 140 may be partitioned into a grid. Based on the camera viewport to field coverage of each section of the grid, the number of the cameras and the position of each camera needed to arrive at a proper coverage of the field 140 while maintaining a high detection accuracy may be determined. In one embodiment, the number of cameras needed to provide a proper coverage of the field was determined to be 12. Note that in some embodiments, this number may vary. For example, for the National Football League (NFL) games, up to eighteen cameras may be needed due to players occluding the ball. The twelve (12) cameras used to detect and track the ball were uniformly selected from the 38 cameras to make sure each pixel in the field was captured by at least three (3) cameras. The twelve cameras (103, 105, 107, 112, 114, 116, 121, 123, 125, 130, 132, and 134) are shown enclosed in a circle or in a square in FIG. 1A. A coverage map 150 on the field 160 of the stadium for the 12 selected cameras (103, 105, 107, 112, 114, 116, 121, 123, 125, 130, 132, and 134) is shown in FIG. 1B. The number in each grid section of the coverage map 150 indicates how many of the 12 cameras (103, 105, 107, 112, 114, 116, 121, 123, 125, 130, 132, and 134) can see that point (i.e., area) on the field 140. As can be seen in FIG. 1B, most of the grid sections within a boundary line 160 of the field 140 have three or more cameras covering the respective grid sections. Only a few grid sections have two camera coverage, resulting in a very small impact.

Ball detection and tracking is performed on each of the videos of the 12 cameras. The detection/tracking results from all 12 cameras are sent to a multi-cam build module to obtain the final 3-D ball location. All cameras are calibrated in advance, but due to such things as, for example, vibrations and other causes, the calibrations may not be 100% accurate. Thus, there may be false alarms or miss detections in any one camera. To overcome false alarms or miss detection in a single camera, the multi-cam build module may perform multi-cam cross validation to obtain the correct 3D ball location.

Figure 2:
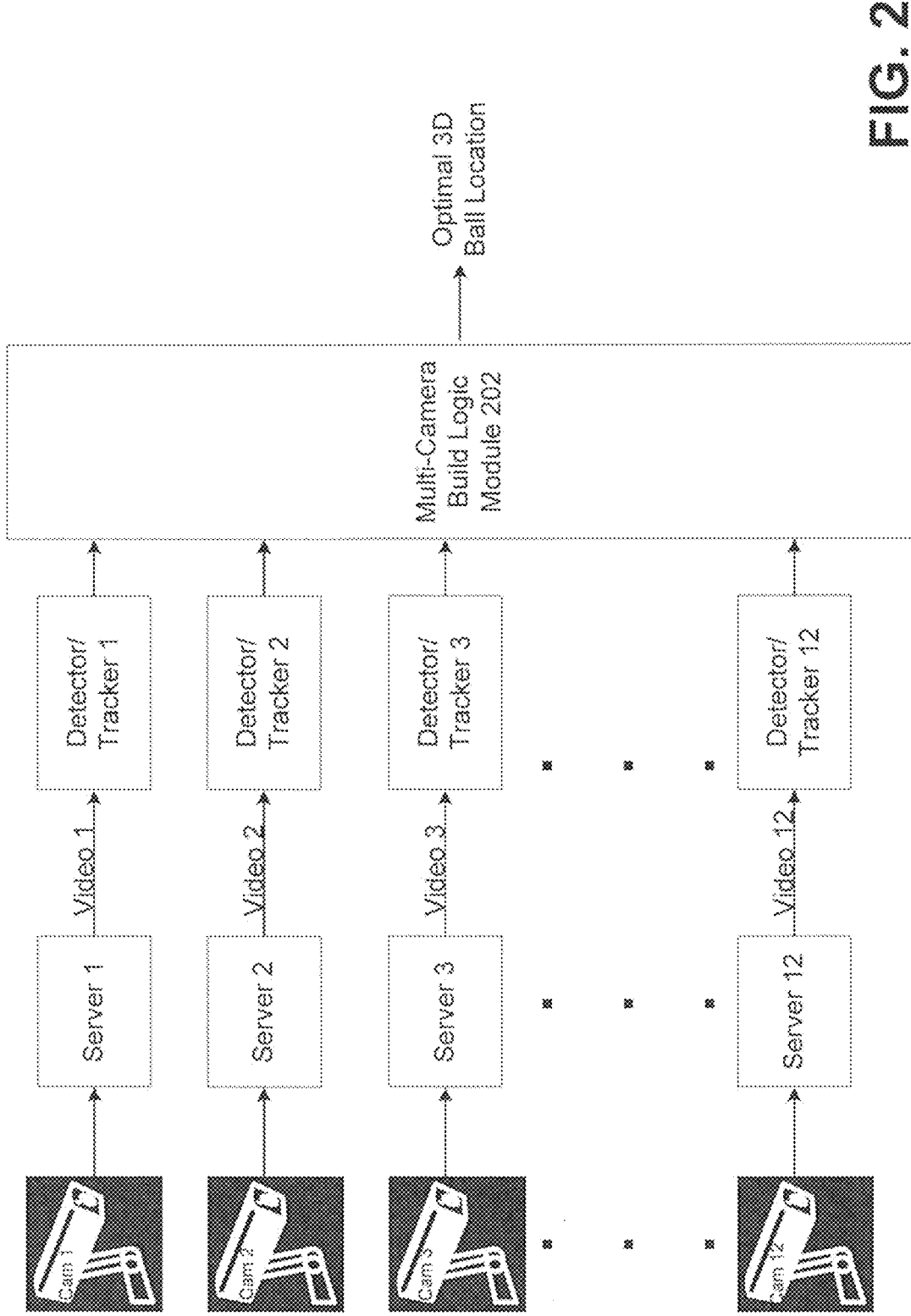
FIG. 2 is an example multi-camera architecture for detecting and tracking a ball in real-time according to an embodiment.

FIG. 2 is an example multi-camera architecture for detecting and tracking a ball in real-time according to an embodiment. The multi-camera architecture comprises a plurality of super high-resolution cameras (Cam 1-Cam 12), such as the twelve cameras identified in FIG. 1A, a plurality of servers (Server 1-Server 12), a plurality of detector/tracker mechanisms (Detector/Tracker 1-Detector/Tracker 2), and a multi-camera build logic module 202. Each of the plurality of super high-resolution cameras (Cam 1-Cam 12) may be coupled to a server (Server 1-Server 12). Each of the servers (Server 1-Server 12) may be coupled to a detector/tracker mechanism (Detector/Tracker 1-Detector/Tracker 12). Each of the detector/tracker mechanisms (Detector/Tracker 1-Detector/Tracker 2) may be coupled to the multi-camera build logic module 202.

The cameras (Cam 1-Cam 12) are used to capture a game being played on the field 140 from 360 degrees in real-time. The real-time video output from each camera (Cam 1-Cam 12) with 30 frames per second (fps) is streamed to one of the detector/tracker mechanisms (Detector/Tracker 1-Detector/Tracker 12), via one of the servers (Server 1-Server 12), to automatically detect and track the game ball with high accuracy and robustness.

The location of the game ball is detected on a frame-by-frame basis in real-time using one of a detection mechanism or a tracking mechanism. The detection mechanism uses a customized detection technique, such as, for example, YOLO (You Only Look Once), with image partition (i.e., tiles) and motion filtering. YOLO is a deep learning Convolutional Neural Network (CNN). The tracking mechanism uses a tracking-by-detection technique that performs a detection only in the partitioned tile in which the ball was located in the last frame. Thus, the detection mechanism performs the detection technique on the full image of a frame while the tracking mechanism performs the tracking technique on a single tile of a full image of a frame.

The ball must first be detected before it can be tracked. When a ball is detected in a frame using the detection mechanism, the ball will be tracked in the next frame using the tracking mechanism. The ball will continue to be tracked in subsequent frames until tracking of the ball fails or the video ends. If tracking fails and the video has not ended, detection of the ball will resume using the detection mechanism.

The output of each detector/tracker (Detector/Tracker 1-Detector/Tracker 12) for each camera is input into the multi-camera build logic module 202 that weeds out miss and false detections that may occur in a one camera solution. The miss and false detections may be the result of the game ball being partially occluded by one or more players in some views, the game ball being blurred or appearing to have little texture due to the fast motion of the game (30 fps video speed at a moderately low video bit rate of 20 Mbps (Mega bits per second)), or an object similar in appearance to the game ball, such as, for example, a player's bald head, a glove, a player's foot or hand, etc. To overcome the miss and false detections, the multi-camera build logic module 202 uses multi-camera cross validation and 3D triangulation to select the right camera set to build the 3D ball location and bundle adjustment to obtain an optimized 3D ball location output.

Figure 3:
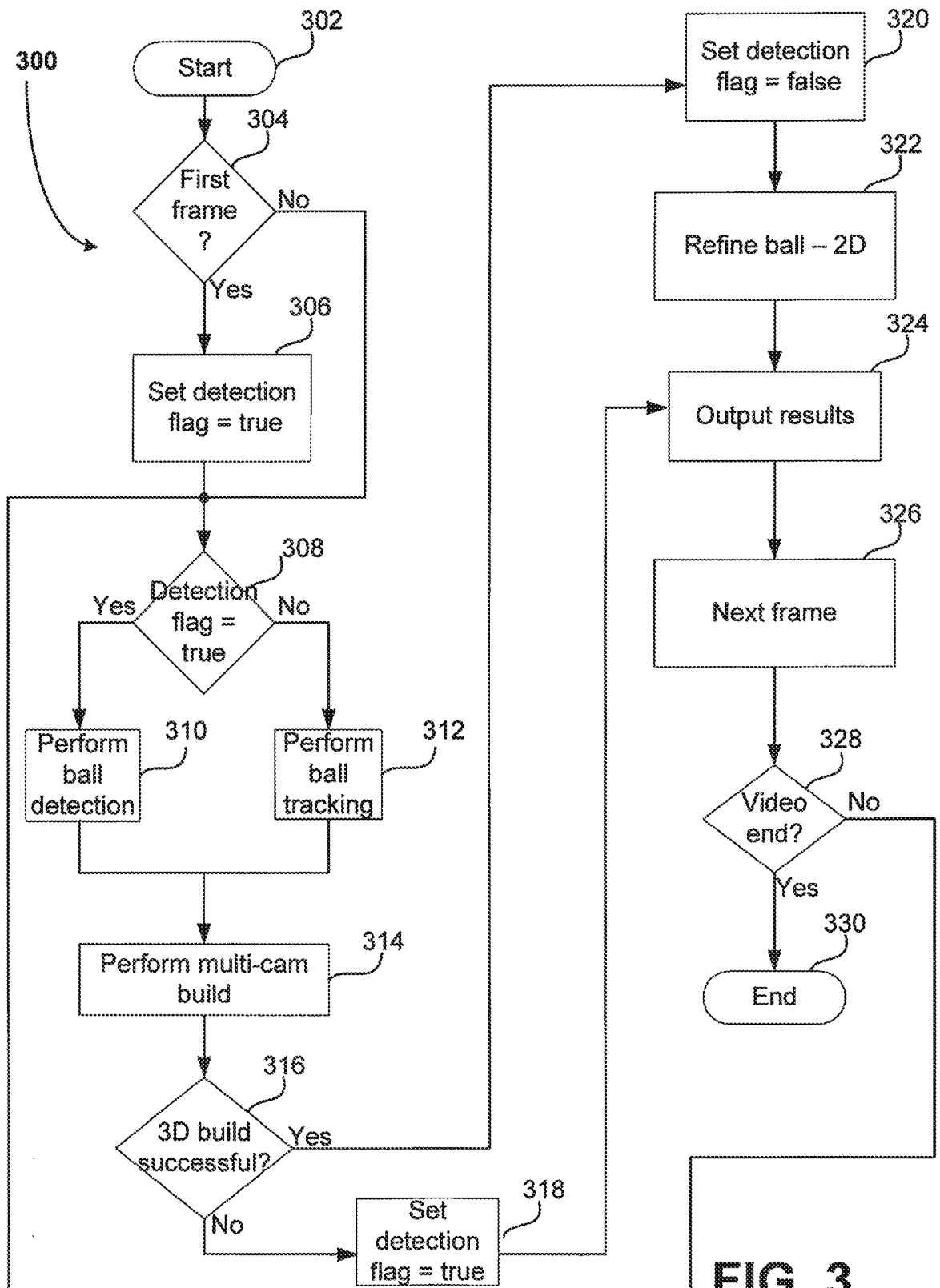
FIG. 3 is a flow diagram of an example method of detecting and tracking a ball in real-time according to an embodiment.

FIG. 3 is a flow diagram of an example method 300 of detecting and tracking a ball in real-time according to an embodiment. The method 300 may generally be implemented in an architecture such as, for example, the multi-camera architecture as shown in FIG. 2. More particularly, the method 300 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 300 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The example method 300 of detecting and tracking the ball in real-time with high accuracy and robustness begins with block 302, where it immediately proceeds to decision block 304. The input is a real-time video stream with 30 fps from 12 cameras. As previously indicated, a ball must first be detected before it can be tracked. In decision block 304, it is determined whether the video input received from the 12 cameras is a first frame of the real-time video stream. If the input received is the first frame of the real time video stream, a detection flag is set to true in block 306 to indicate that the ball has not yet been detected. The process then proceeds to decision block 308.

In decision block 308, it is determined whether the detection flag is true. If the detection flag is true, then the process proceeds to block 310, where detection of the ball is performed separately for each camera. In one embodiment, customized YOLO detection may be used with image partitioning and motion-based filtering. In another embodiment, other types of customized detection methods may be used, such as, but not limited to, Faster RCNN (Fast Region-based Convolutional Neural Network) and SSD (Single Shot MultiBox Detector). The detection process is described below with reference to FIG. 4. The process then proceeds to block 314.

As previously indicated, once a ball has been detected in a frame, the ball will be tracked in the next frame using the tracking mechanism. Returning to decision block 308, if the detection flag is false, the process proceeds to block 312, where tracking of the ball is performed separately for each camera. In an embodiment, tracking-by-detection may be used to detect the ball in a tile in which the ball was located in the previous frame. In other words, tracking of the ball is accomplished by performing a search (i.e., detection) of the ball on a single tile close to the ball location found in the previous frame. The tile is set by taking the ball position of the previous frame as the center of the tile. The ball will continue to be tracked in subsequent frames until tracking of the ball fails or the video ends. If tracking fails and the video has not ended, detection of the ball will resume using the detection mechanism described below with reference to FIG. 4. The tracking process is described below with reference to FIG. 5. The process then proceeds to block 314.

In block 314, a multi-cam build is performed using the detection and/or tracking outputs from all 12 cameras. In one embodiment, the multi-cam build is used to select correct camera sets that provide the best ball detection using multi-cam cross validation, 3D triangulation, and bundle adjustment to optimize the final 3D ball location result. The multi-cam build process is described below with reference to FIG. 6. The process then proceeds to decision block 316.

In decision block 316, it is determined whether a 3D build, from the multi-cam build of block 314, was successful. If the 3D build was not successful, the process proceeds to block 318.

In block 318, the detection flag is set to true to indicate that the ball was not detected and that in the next frame the detection process may be restarted. The process then proceeds to block 324.

In block 324, the results of the 3D build are output. In an embodiment where the 3D build is unsuccessful, an indication that detection of the ball has failed may be output. In one embodiment, such an indication may be a special value to indicate the failed detection. In an embodiment where the 3D build is successful, the output may include the 3D ball location. In one embodiment, the output may include the position of the ball and the tile in which the ball is located. The process then proceeds to block 326.

Returning back to decision block 316, if it is determined that the 3D build is successful, the process then proceeds to block 320. In block 320, the detection flag is set to false to enable ball tracking on the next frame. The process then proceeds to block 322.

In block 322, the ball location is refined in 2D. In this instance, the 3D ball location is projected onto each of the 12 cameras in 2D. In instances where there may have been computation errors, the projected position may not exactly equal the actual position of the ball, but should come close. The ball location is refined by performing a detection around the projected position to obtain a more accurate ball location. The process then proceeds to block 324.

As previously indicated, in block 324, the results of the 3D build are output. In an embodiment where the 3D build is successful, the output may include the 3D ball location. In one embodiment, the output may include the position of the ball and the tile in which the ball is located. In an embodiment where the 3D build is unsuccessful, an indication that detection of the ball has failed may be output. In one embodiment, such an indication may be a special value to indicate the failed detection. The process then proceeds to block 326.

In block 326, the video advances to the next frame. The process then proceeds to decision block 328.

In decision block 328, it is determined if the video has ended. If the video has not ended, the process proceeds back to decision block 308, where it is determined whether to detect the ball or track the ball.

Returning back to decision block 328, if it is determined that the video has ended, the process then proceeds to block 330, where the process ends.

Figure 4:
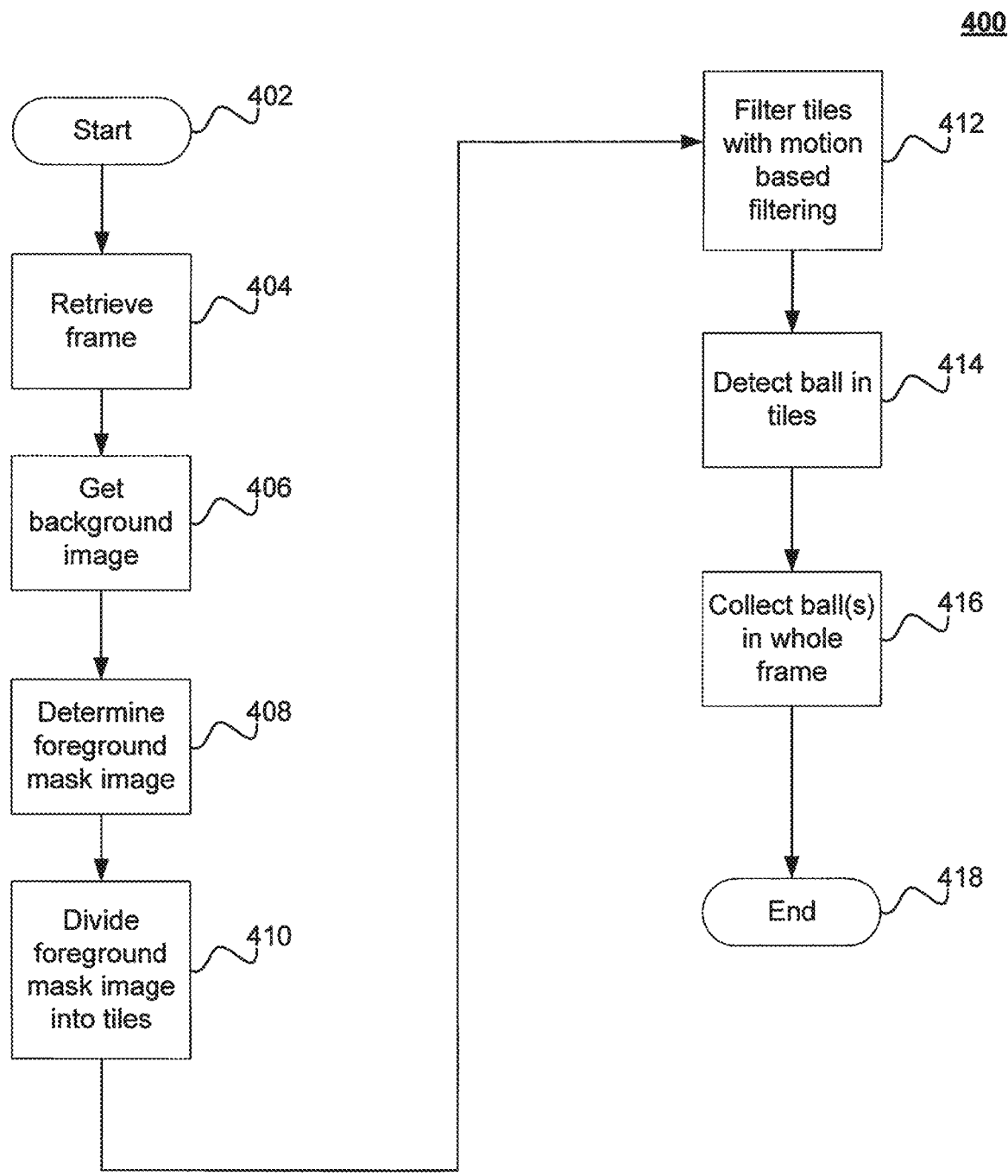
FIG. 4 is a flow diagram of an example method of detecting a small ball for a single camera according to an embodiment.

FIG. 4 is a flow diagram of an example method 400 of detecting a small ball for a single camera according to an embodiment. The method 400 may generally be implemented in a multi-camera architecture, such as, for example, the multi-camera architecture as shown in FIG. 2. More particularly, the method 400 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

Ball detection is performed on each camera and then the 2D results from each camera are sent to the multi-cam building module. First, an image frame and a background image are uploaded. The background image is a static image that is taken prior to the game activities. Therefore, no ball or players of the game exist in this image. Each camera has its own background image.

The process begins in block 402, where the process immediately proceeds to block 404. In block 404, the frame is retrieved. The process then proceeds to block 406.

In block 406, a background image for the camera is also retrieved. The process then proceeds to block 408.

In block 408, a foreground mask is determined by removing the background image from the retrieved frame image. The process then proceeds to block 410.

Figure 4A:
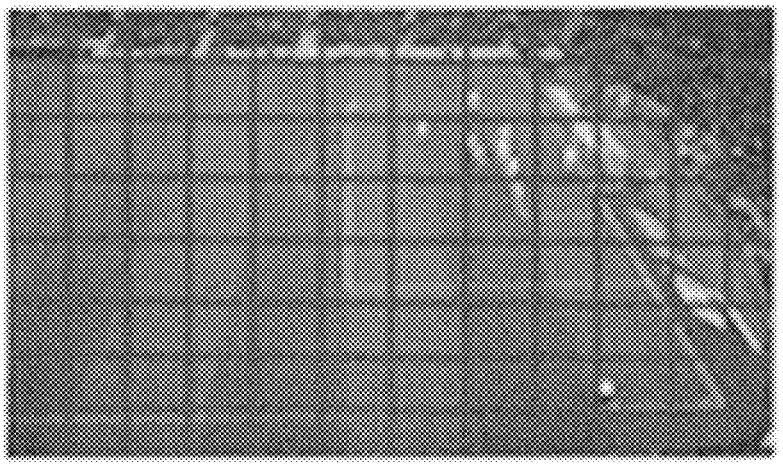
FIG. 4A represents an example of a foreground mask partitioned into tiles according to an embodiment.

In block 410, the foreground mask is partitioned into tiles. In one embodiment, each tile size is 320×320 pixels. This results in approximately 198 tiles. FIG. 4A represents an example of a foreground mask partitioned into tiles according to an embodiment. The process then proceeds to block 412.

Figure 4B:
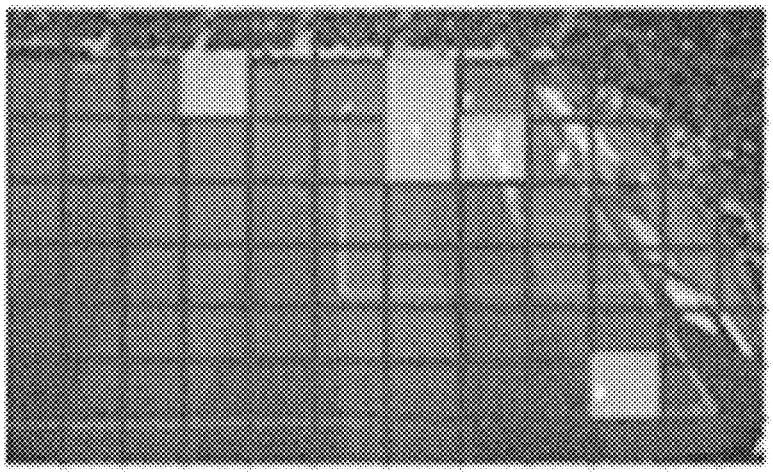
FIG. 4B is an example illustration of a motion filtered, partitioned foreground mask according to an embodiment.

In block 412, the tiles are pre-filtered for motion. This is accomplished by filtering out the audience area, the lines on the field, and any remaining static areas. FIG. 4B is an example illustration of a motion filtered, partitioned foreground mask according to an embodiment. The black/dark tiles represent static areas and the white/light tiles represent motion. The process then proceeds to block 414.

Figure 4C:
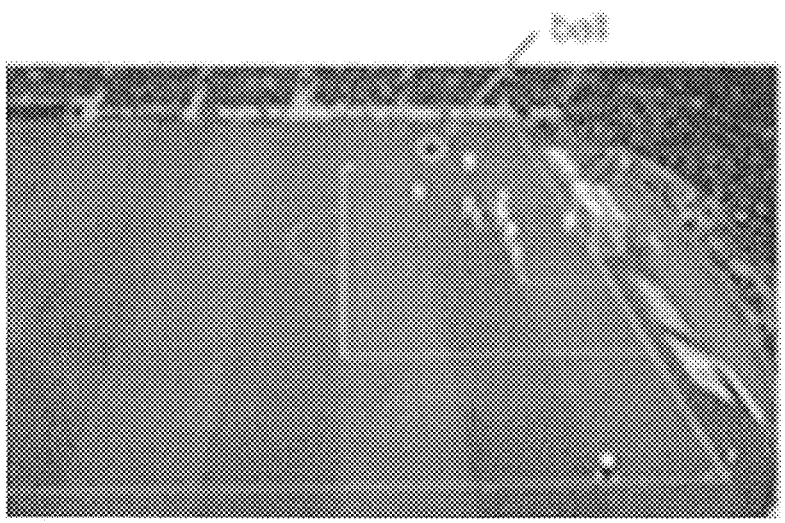
FIG. 4C is an example illustration of a detected ball from the partitioned and motion filtered foreground mask of FIGS. 4A and 4B according to an embodiment.

Once the pre-filtering is complete, in block 414, detection of the ball is performed for each tile that indicates motion. On average, after pre-filtering, there are approximately thirty-two (32) tiles in which to detect the ball (statistics on 12 cameras), thereby reducing the computation by 83.85%, making ball detection and tracking possible to run in real-time. As previously indicated, in one embodiment, YOLO may be used to detect the ball. In other embodiments, other object detection methods that enable small object detection may be used, such as, but not limited to, Faster RCNN, SSD, etc. FIG. 4C is an example illustration of a detected ball from the partitioned and motion filtered foreground mask of FIGS. 4A and 4B according to an embodiment. The process then proceeds to block 416.

In block 416, detection results from all tiles are collected to form a final whole image result for one frame. The process then proceeds to block 418, where the process ends.

Once the ball has been detected using the process described above with reference to FIG. 4, detection results from all cameras for that frame are input into the multi-camera build to determine the correct location of the ball for that frame.

During a sports game, the motion of the ball is continuous and smooth in spatial and temporal domains, and the distance between frames is small. Thus, tracking in the next frame may be performed using a local area of the previous frame where the ball was detected instead of performing another detection on the whole frame. This scheme is referred to as tracking-by-detection. Tracking-by-detection performs detection in a single tile; the single tile being determined using the ball position from the previous frame. This criterion provides high accuracy since detection is based on advanced CNN (Convolutional Neural Network) features. The process is highly efficient and very fast compared to the detection process described above with reference to FIG. 4 because it only operates on a single tile, and the entire operation may be performed in a GPU (no data transfer between CPU and GPU memory).

Figure 5:
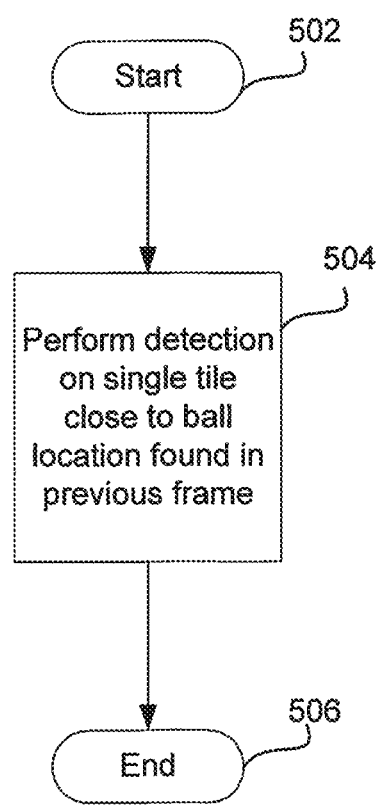
FIG. 5 is a flow diagram of an example method of tracking a small ball for a single camera according to an embodiment.

FIG. 5 is a flow diagram of an example method 500 of tracking a small ball for a single camera according to an embodiment. The method 500 may generally be implemented in a multi-camera architecture, such as, for example, the multi-camera architecture as shown in FIG. 2. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 502, where the process immediately proceeds to block 504. In block 504, tracking-by-detection is performed on a single tile. The location of the single tile is set by using the ball center from the previous frame in which the ball was located as the center of the single tile. Detection is only performed on the single tile, using techniques such as, for example, YOLO, Faster RCNN, SSD, etc. The process then proceeds to block 506.

In block 506, the process ends.

Even though fine-tuned single camera detection results have a high accuracy, single camera detection may fail when the ball is partially or totally occluded in some views, the ball is blurred or with less texture due to fast motion (30 fps video speed) and moderately low video bitrate (20 Mbps), or a similar object, such as, for example, the bald head of a player, a player's hand or foot, a glove, etc., is detected as the ball. Thus, there are some false and miss detections in a single camera which cannot be recovered by only using a single camera solution. Embodiments, therefore, use a multi-cam build solution to select the correct camera set and build the final 3D ball location. After ball detection and/or tracking has been done for each camera for a frame, the results for each camera are input into the multi-camera build module as indicated above with reference to FIG. 3. The multi-camera build module uses multi-cam cross validation to determine which cameras have detected the ball correctly and then performs a 3D triangulation and bundle adjustment to optimize the final 3D ball results.

Figure 6:
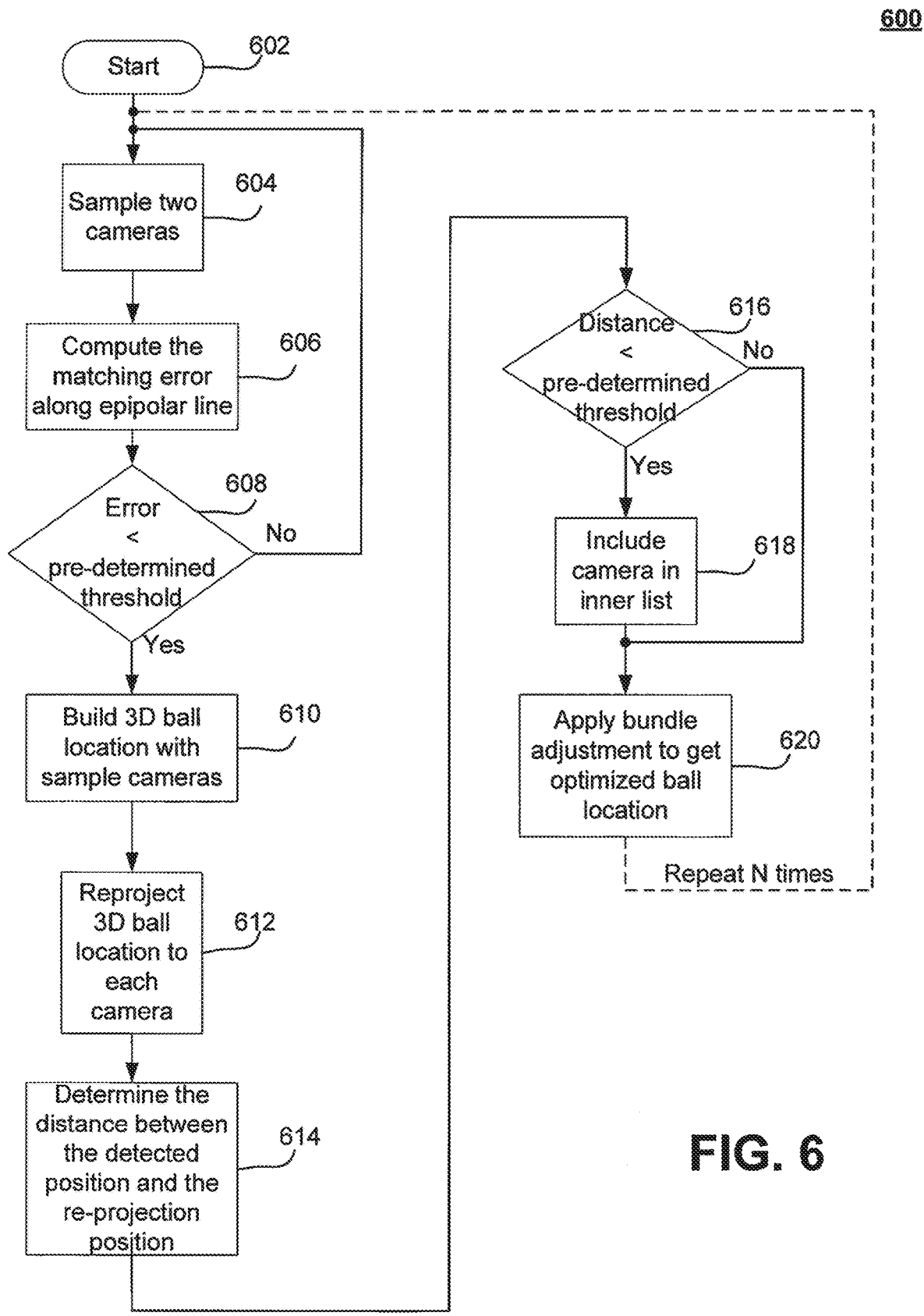
FIG. 6 is a flow diagram of an example method of a multi-camera build using input from all twelve (12) cameras according to an embodiment.

FIG. 6 is a flow diagram of an example method 600 of a multi-camera build using input from all twelve (12) cameras according to an embodiment. The method 600 may generally be implemented in a multi-camera architecture, such as, for example, the multi-camera architecture as shown in FIG. 2. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, and fixed-functionality logic hardware using circuit technology such as, for example, ASIC, CMOS or TTL technology, or any combination thereof.

The process begins in block 602, where the process immediately proceeds to block 604. In block 604, the detection results of two of the twelve cameras are sampled. In another embodiment, three of the twelve cameras may be sampled. The cameras are randomly selected using a random sampling method. In one embodiment, RANSAC (Random Sample Consensus) is used, which is well known to one skilled in the relevant art(s). In other embodiments, other random sampling methods may be used. The process then proceeds to block 606.

In block 606, a matching error along the epipolar line is calculated. The process then proceeds to decision block 608.

In decision block 608, it is determined whether the matching error is less than a pre-determined threshold. If the matching error is equal to or exceeds the pre-determined threshold, there is a miss or false detection with at least one of the two sampled cameras selected. The process then returns to block 604 to repeat the process of randomly sampling two of the twelve cameras, computing the matching error along the epipolar line, and determining if the matching error is less than the pre-determined threshold. If the matching error is less than the pre-determined threshold, the two sampled cameras have detected the ball correctly. The process then proceeds to block 610.

In block 610, the two sampled cameras (i.e., selected cameras) are used to build the 3D ball location. The process then proceeds to block 612.

In block 612, the 3D ball location is re-projected onto each camera in 2D (2-Dimensions). The process then proceeds to block 614.

In block 614, the distance between the detected location of the ball and the re-projection location of the ball for each camera is determined. The process then proceeds to decision block 616.

In decision block 616, it is determined whether the distance, determined in block 614, is less than a pre-determined threshold. If the distance is less than the pre-determined threshold, the camera is placed on an inner list in block 618, indicating that the results from the camera are good. If the distance is equal to or greater than the pre-determined threshold, the camera is considered an outlier. The process then proceeds to block 620.

In block 620, bundle adjustment is applied to obtain an optimized 3D ball location and the correct inner camera set using the following equations:

$$F(X) = \frac{1}{2} f^T f$$

$$f(X) = P_{3m+4} * X_{4+1} - x_{3m+1} = \begin{bmatrix} P_1 \\ P_2 \\ \dots \\ P_m \end{bmatrix} \cdot X - \begin{bmatrix} x_1 \\ x_2 \\ \dots \\ x_m \end{bmatrix} = \text{result}_{3m+1}$$

where: P is the re-project matrix, size 3×4
X is the input 3D ball location in homogeneous format (x, y, z, 1)
x is the re-projected result in 2D camera (x, y, 1)
$f$ is a function
F(X) is another function defined on $f$
The object function is to get optimal X through minimization $f(X)$. In one embodiment, Levenberg-Marquardt algorithm (well known to those skilled in the relevant art(s)) is used to solve the optimization. Bundle adjustment is well known to those skilled in the relevant art(s).

The entire process (blocks 604 to 620) may be repeated N times to get the optimal result with minimal re-project error. N may vary, depending on, for example, the number of cameras used, and the type of game being played. For example, the more cameras that are used, the larger N becomes.

Figure 7:
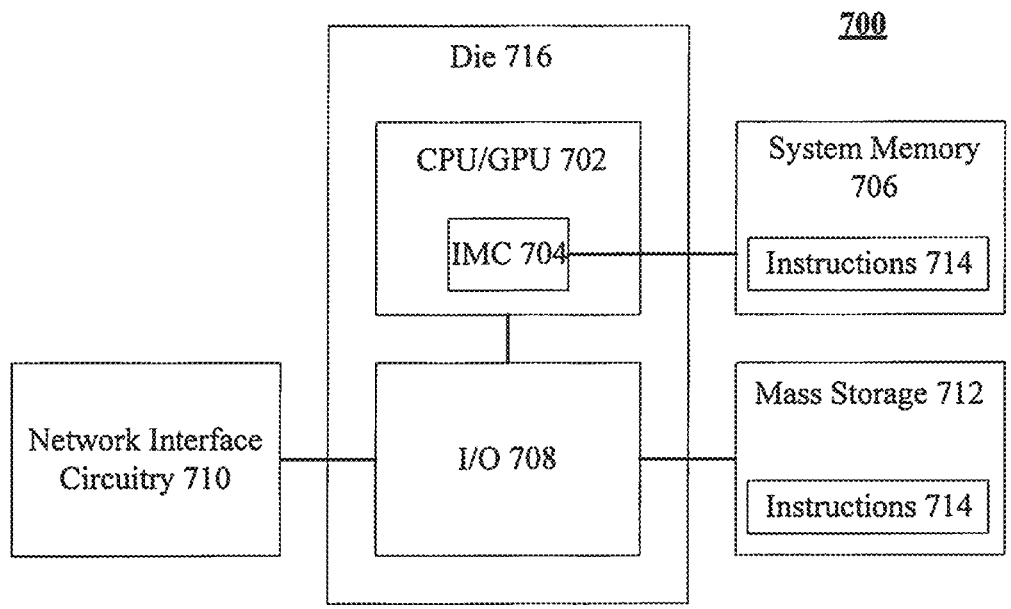
FIG. 7 illustrates a system diagram that may be readily substituted for portions of the multi-camera architecture in FIG. 2 according to an embodiment.

FIG. 7 shows a system 700 that may be readily substituted for portions of the multi-camera architecture shown above with reference to FIG. 2. The illustrated system 700 includes a central processing unit/CPU coupled to a graphics processing unit/GPU, shown as CPU/GPU processors 702, having an integrated memory controller (IMC) 704 coupled to a system memory 706 (e.g., volatile memory, 3D) (Point memory, dynamic random-access memory/DRAM). The CPU/GPU processors 702 may each include a core region with one or more processor cores (not shown). The CPU/GPU processors 702 may also be coupled to an input/output (I/O) module 708 that communicates with network interface circuitry 710 (e.g., network controller, network interface card/NIC) and mass storage 712 (non-volatile memory/NVM, hard disk drive/HDD, optical disk, solid state disk/SSD, flash memory). The network interface circuitry 710 may receive video such as, for example, the video streams from Cam 1-Cam 12 (shown in FIG. 2), wherein the system memory 706 and/or the mass storage 712 may be memory devices that store instructions 714, which when executed by the CPU/GPU processors 702, cause the system 700 to perform one or more aspects of the method 300 (FIG. 3), the method 400 (FIG. 4), the method 500 (FIG. 5), and the method 600 (FIG. 6), already discussed. Thus, execution of the instructions 714 may cause the system 700 to [enter steps from flow of the invention]. The processor 702 and the IO module 708 may be incorporated into a shared die 716 as a system on chip (SoC).

Figure 8:
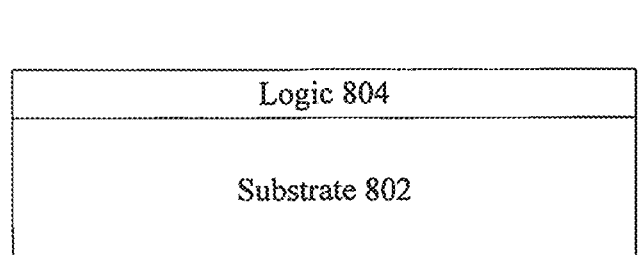
FIG. 8 is an illustration of an example of a semiconductor package apparatus according to an embodiment.

FIG. 8 shows a semiconductor package apparatus 800 (e.g., chip) that includes a substrate 802 (e.g., silicon, sapphire, gallium arsenide) and logic 804 (e.g., transistor array and other integrated circuit/IC components) coupled to the substrate 802. The logic 804, which may be implemented in configurable logic and/or fixed-functionality logic hardware, may generally implement one or more aspects of the method 300 (FIG. 3), the method 400 (FIG. 4), the method 500 (FIG. 5), and the method 600 (FIG. 6), already discussed.

Figure 9:
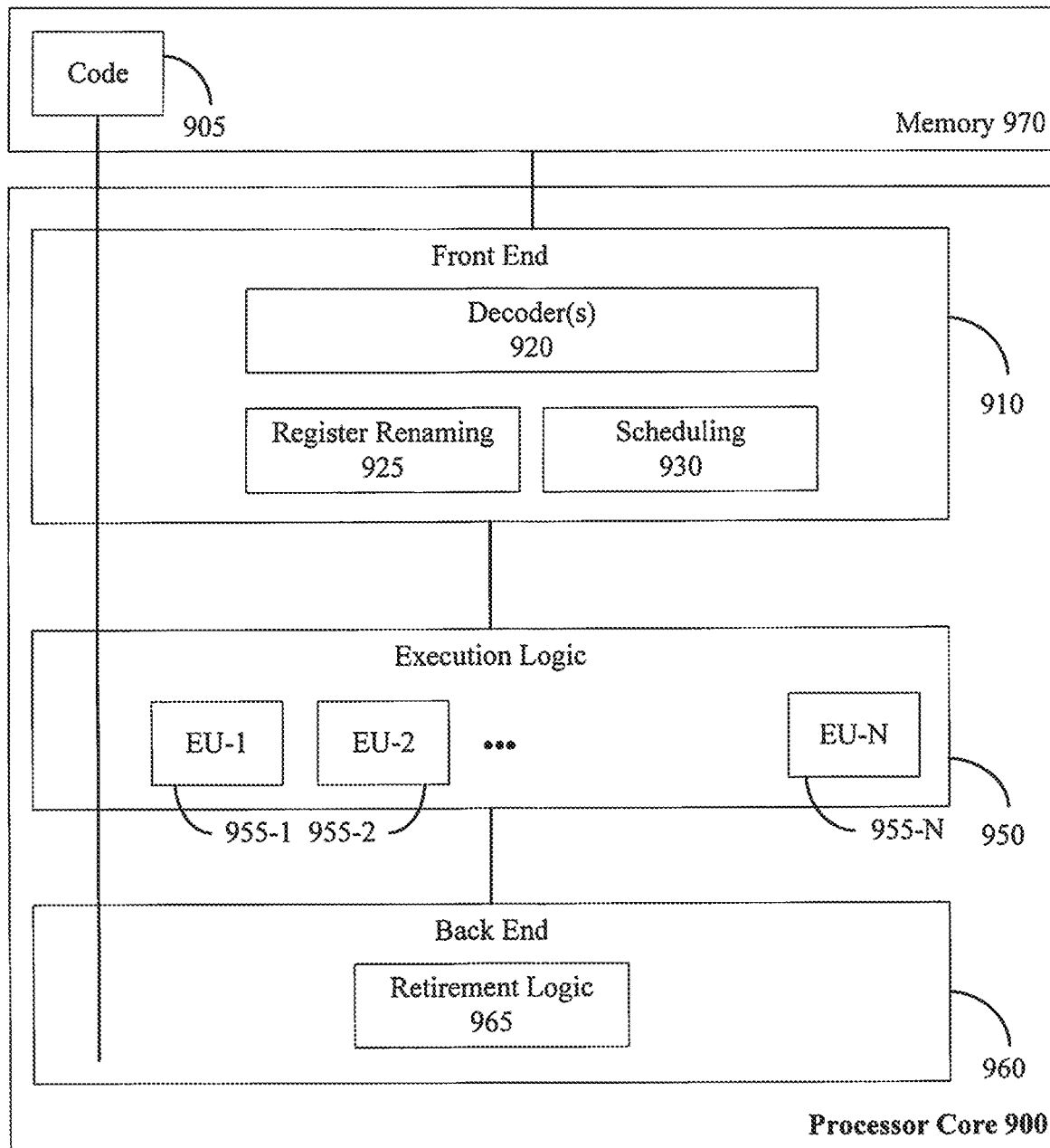
FIG. 9 is a block diagram of an exemplary processor according to an embodiment.

FIG. 9 illustrates a processor core 900 according to one embodiment. The processor core 900 may be the core for any type of processor, such as a micro-processor, an embedded processor, a digital signal processor (DSP), a network processor, or other device to execute code. Although only one processor core 900 is illustrated in FIG. 9, a processing element may alternatively include more than one of the processor core 900 illustrated in FIG. 9. The processor core 900 may be a single-threaded core or, for at least one embodiment, the processor core 900 may be multithreaded in that it may include more than one hardware thread context (or "logical processor") per core.

FIG. 9 also illustrates a memory 970 coupled to the processor core 900. The memory 970 may be any of a wide variety of memories (including various layers of memory hierarchy) as are known or otherwise available to those of skill in the art. The memory 970 may include one or more code 905 instruction(s) to be executed by the processor core 900, wherein the code 905 may implement the method 400 (FIG. 4), the method 400 (FIG. 4), the method 500 (FIG. 5), and the method 600 (FIG. 6), already discussed. The processor core 900 follows a program sequence of instructions indicated by the code 905. Each instruction may enter a front end portion 910 and be processed by one or more decoders 920. The decoder 920 may generate as its output a micro operation such as a fixed width micro operation in a predefined format, or may generate other instructions, microinstructions, or control signals which reflect the original code instruction. The illustrated front end portion 910 also includes register renaming logic 925 and scheduling logic 930, which generally allocate resources and queue the operation corresponding to the convert instruction for execution.

The processor core 900 is shown including execution logic 950 having a set of execution units 955-1 through 955-N. Some embodiments may include a number of execution units dedicated to specific functions or sets of functions. Other embodiments may include only one execution unit or one execution unit that can perform a particular function. The illustrated execution logic 950 performs the operations specified by code instructions.

After completion of execution of the operations specified by the code instructions, back end logic 960 retires the instructions of the code 905. In one embodiment, the processor core 900 allows out of order execution but requires in order retirement of instructions. Retirement logic 965 may take a variety of forms as known to those of skill in the art (e.g., re-order buffers or the like). In this manner, the processor core 900 is transformed during execution of the code 905, at least in terms of the output generated by the decoder, the hardware registers and tables utilized by the register renaming logic 925, and any registers (not shown) modified by the execution logic 950.

Although not illustrated in FIG. 9, a processing element may include other elements on chip with the processor core 900. For example, a processing element may include memory control logic along with the processor core 900. The processing element may include I/O control logic and/or may include I/O control logic integrated with memory control logic. The processing element may also include one or more caches.

Figure 10:
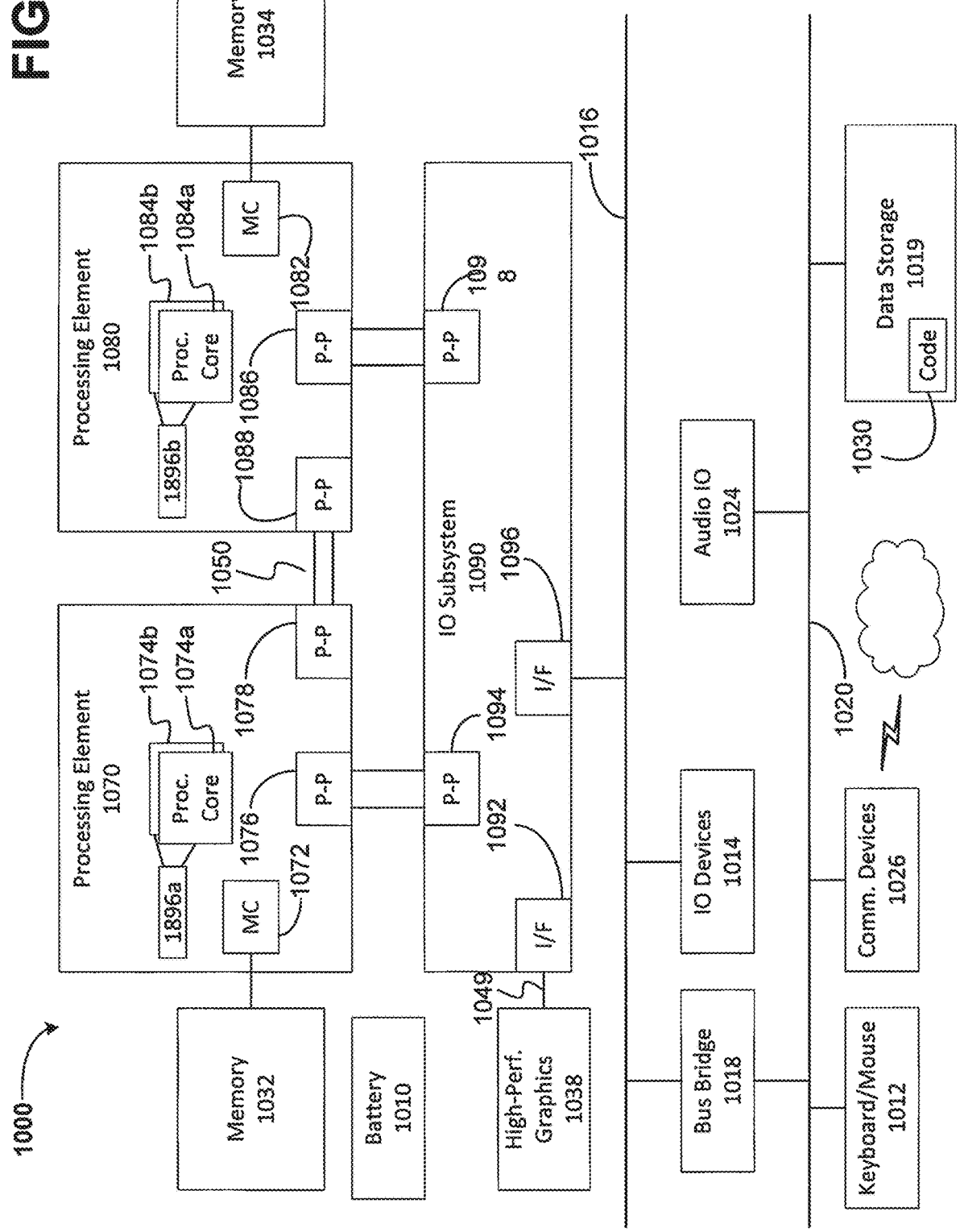
FIG. 10 is a block diagram of an exemplary computing system according to an embodiment.

Referring now to FIG. 10, shown is a block diagram of a computing system 1000 in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1096a, 1096b. The shared cache 1096a, 1096b may store data (e.g., instructions) that are utilized by one or more engines of the processor, such as the cores 1074a, 1074b and 1084a, 1084b, respectively. For example, the shared cache 1096a, 1096b may locally cache data stored in a memory 1032, 1034 for faster access by engines of the processor. In one or more embodiments, the shared cache 1096a, 1096b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these engines.

In turn, I/O subsystem 1090 may be coupled to a first bus 1016 via an interface 1096. In one embodiment, the first bus 1016 may be a Peripheral Engine Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3), the method 400 (FIG. 4), method 500 (FIG. 5), and the method 600 (FIG. 6), already discussed, and may be similar to the code 905 (FIG. 9), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 may include a multi-camera architecture for detecting and tracking a ball in real-time, comprising network interface circuitry to receive a plurality of real-time videos taken from a plurality of high-resolution cameras, each of the high-resolution cameras simultaneously capturing a sports event, wherein each of the plurality of high-resolution cameras includes a viewpoint that covers an entire playing field where the sports event is played; one or more processors coupled to the network interface circuitry; one or more memory devices coupled to the one or more processors, the one or more memory devices including instructions to determine a location of a ball for each frame of the plurality of real-time videos, which when executed by the one or more processors, cause the multi-camera architecture to simultaneously perform one of a detection scheme or a tracking scheme on a frame from each of the plurality of real-time videos to detect the ball used in the sports event; and perform a multi-camera build to determine the location of the ball in 3D (3-Dimensions) for the frame from each of the plurality of real-time videos using one of detection or tracking results for each camera.

Example 2 may include the multi-camera architecture of example 1, wherein the detection scheme comprises instructions, which when executed by the one or more processors, cause the multi-camera architecture to retrieve the frame for each of the cameras; retrieve a background image from each of the cameras; remove the background image from the frame to obtain a foreground mask for each of the cameras; partition the foreground mask into tiles to obtain a partitioned foreground mask for each of the cameras; perform motion filtering on the partitioned foreground to mask to obtain a motion filtered foreground mask for each of the cameras; perform detection of the ball for each tile in the frame of the motion filtered foreground mask that indicates motion is occurring for each of the cameras; and collect detection results from all of the tiles in the frame for each of the cameras.

Example 3 may include the multi-camera architecture of example 1, wherein the tracking scheme comprises instructions, that when executed by the one or more processors, cause the multi-camera architecture to perform tracking-by-detection when the ball was detected in a previous frame, wherein instructions to perform tracking-by-detection further comprise instructions to only perform detection on a single tile, the single tile being set using a ball center of the previous frame in which the ball was detected or tracked as a tile center for the single tile.

Example 4 may include the multi-camera architecture of any of examples 2-3, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 5 may include the multi-camera architecture of example 1, wherein the multi-camera build comprises instructions, that when executed by the one or more processors, cause the multi-camera architecture to perform a multi-camera cross validation, the multi-camera cross validation including instructions to sample the detection results from a set of cameras, wherein the set of cameras are selected using a random sampling method; and calculate a matching error along an epipolar line for the set of cameras randomly selected; when the matching error is equal to or greater than a predetermined threshold, a miss or false detection has occurred, wherein instructions further comprise to repeat the multi-camera cross validation instructions until the matching error is less than the predetermined threshold; and when the matching error is less than the predetermined threshold, multi-camera build instructions further comprise instructions to determine a 3D ball location using the sample cameras, re-project the 3D ball location onto each of the cameras, and determine a distance between a detected position of the ball and a re-projection position of the ball for each of the cameras, wherein if the distance is less than a pre-determined threshold, the results from the detection of the ball are correct using the set of cameras, wherein the multi-camera build instructions further comprise instructions to place the set of cameras on an inner list and apply bundle adjustment to get an optimized 3D ball location.

Example 6 may include the multi-camera architecture of example 5, wherein the multi-camera build further comprises instructions to repeat all of the multi-camera build instructions N times to obtain an optimal result with minimal re-project error.

Example 7 may include the multi-camera architecture of example 1, wherein when the multi-camera build is successful, the tracking scheme is used in the next frame of each of the videos to locate the ball; and wherein when the multi-camera build is unsuccessful, the detection scheme is used in the next frame of each of the videos to locate the ball.

Example 8 may include the multi-camera architecture of example 1, wherein further instructions, which when executed by the one or more processors, cause the multi-camera architecture to project the 3d ball location onto each of the results of the plurality of cameras in 2D (2-Dimensions); perform the detection around a projected position to obtain a more accurate location of the ball for the frame from each of the cameras; and continuously advance each of the plurality of real-time videos to a next frame to repeat the instructions to determine the location of the ball for the next frame until the plurality of real-time videos end.

Example 9 may include a semiconductor package apparatus comprising one or more substrates; and logic coupled to the one or more substrates, wherein the logic includes one or more of configurable logic or fixed-functionality hardware logic, the logic coupled to the one or more substrates to simultaneously perform one of a detection scheme or a tracking scheme on a frame from each of a plurality of real-time videos captured from at least twelve high-resolution cameras to detect a ball used in a sports event; and perform a multi-camera build to determine a location of the ball in 3D (3-Dimension) for the frame from each of the plurality of real-time videos using one of detection or tracking results for each of the cameras.

Example 10 may include the apparatus of example 9, wherein the detection scheme further includes logic coupled to the substrate to retrieve the frame for each of the cameras; retrieve a background image from each of the cameras; remove the background image from the frame to obtain a foreground mask for each of the cameras; partition the foreground mask into tiles to obtain a partitioned foreground mask for each of the cameras; perform motion filtering on the partitioned foreground mask to obtain a motion filtered foreground mask for each of the cameras; perform detection of the ball for each tile in the frame of the motion filtered foreground mask that indicates motion is occurring for each of the cameras; and collect detection results from all of the tiles in the frame for each of the cameras.

Example 11 may include the apparatus of example 9, wherein the tracking scheme further includes logic coupled to the substrate to perform tracking-by-detection when the ball was detected in a previous frame, wherein instructions to perform tracking-by-detection further comprise instructions to only perform detection on a single tile, the single tile being set using a ball center of the previous frame in which the ball was detected or tracked as a tile center for the single tile.

Example 12 may include the apparatus of any of examples 10-11, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 13 may include the apparatus of example 9, wherein the multi-camera build includes logic coupled to the substrate to perform a multi-camera cross validation, the multi-camera cross validation including logic to sample the detection results from a set of cameras, wherein the set of cameras are selected using a random sampling method; and calculate a matching error along an epipolar line for the set of cameras randomly selected; wherein when the matching error is equal to or greater than a predetermined threshold, a miss or false detection has occurred, the logic coupled to the substrate further includes logic to repeat the multi-camera cross validation instructions until the matching error is less than the predetermined threshold; and wherein when the matching error is less than the predetermined threshold, multi-camera build logic further includes logic to determine a 3D ball location using the sample cameras, re-project the 3D ball location onto each camera, and determine a distance between a detected position of the ball and a re-projection position of the ball for each camera, wherein if the distance is less than a pre-determined threshold, the results from the detection of the ball are correct using the set of cameras, wherein the multi-camera build logic further includes logic to place the set of cameras on an inner list and apply bundle adjustment to get an optimized 3D ball location.

Example 14 may include the apparatus of example 13, wherein the multi-camera build further includes logic coupled to the substrate to repeat all of the multi-camera build logic N times to obtain an optimal result with minimal re-project error.

Example 15 may include the apparatus of example 9, wherein when the multi-camera build is successful, the tracking scheme is used in the next frame of each of the real-time videos to locate the ball; and wherein when the multi-camera build is unsuccessful, the detection scheme is used in the next frame of each of the real-time videos to locate the ball.

Example 16 may include the apparatus of example 9, wherein the logic coupled to the substrate further includes logic to project the 3d ball location onto each of the results of the plurality of cameras in 2D (2-Dimensions); perform the detection around a projected position to obtain a more accurate location of the ball for the frame from each of the cameras; and continuously advance each of the plurality of real-time videos to a next frame to repeat the logic to determine the location of the ball for the next frame until the plurality of real-time videos end.

Example 17 may include a method of detecting and tracking a ball in a multi-camera architecture in real-time comprising simultaneously performing one of a detection scheme or a tracking scheme on a frame from each of a plurality of videos captured from at least twelve high-resolution cameras to detect a ball used in a sports event; and performing a multi-camera build to determine a location of the ball in 3D (3-Dimensions) for the frame from each of the plurality of videos using one of detection or tracking results for each camera.

Example 18 may include the method of example 17, wherein the detection scheme comprises retrieving the frame for each of the cameras; retrieving a background image from each of the cameras; removing the background image from the frame to obtain a foreground mask for each of the cameras; partitioning the foreground mask into tiles to obtain a partitioned foreground mask for each of the cameras; performing motion filtering on the partitioned foreground mask to obtain a motion filtered foreground mask for each of the cameras; performing detection of the ball for each tile in the frame of the motion filtered foreground mask that indicates motion is occurring for each of the cameras; and collecting detection results from all of the tiles in the frame for each of the cameras.

Example 19 may include the method of example 17, wherein the tracking scheme comprises performing tracking-by-detection when the ball was detected in a previous frame, wherein tracking-by-detection comprises only performing detection on a single tile, the single tile being set using a ball center of the previous frame in which the ball was detected or tracked as a tile center for the single tile.

Example 20 may include the method of any of examples 18-19, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 21 may include the method of example 17, wherein the multi-camera build comprises performing a multi-camera cross validation, the multi-camera cross validation includes sampling the detection results from a set of cameras, wherein the set of cameras are selected using random sampling; and calculating a matching error along an epipolar line for the set of cameras randomly selected; when the matching error is equal to or greater than a predetermined threshold, a miss or false detection has occurred, the multi-camera build further includes repeating the multi-camera cross validation instructions until the matching error is less than the predetermined threshold; and when the matching error is less than the predetermined threshold, the multi-camera build further includes determining a 3D ball location using the sample cameras, re-projecting the 3D ball location onto each camera, and determining a distance between a detected position of the ball and a re-projection position of the ball for each camera, wherein if the distance is less than a pre-determined threshold, the results from the detection of the ball are correct using the set of cameras, wherein the multi-camera build further includes placing the set of cameras on an inner list and applying bundle adjustment to get an optimized 3D ball location.

Example 22 may include the method of example 21, wherein the multi-camera build further includes repeating all of the multi-camera build method N times to obtain an optimal result with minimal re-project error.

Example 23 may include the method of example 17, wherein when the multi-camera build is successful, using the tracking scheme in the next frame of each of the videos to locate the ball; and wherein when the multi-camera build is unsuccessful, using the detection scheme in the next frame of each of the videos to locate the ball.

Example 24 may include the method of example 17, further comprising projecting the 3D ball location onto each of the results of the plurality of cameras in 2D (2-Dimensions); performing the detection around a projected position to obtain a more accurate location of the ball for the frame from each of the cameras; and continuously advancing each of the plurality of real-time videos to a next frame to repeat determining the location of the ball for the next frame until the plurality of real-time videos end.

Example 25 may include an apparatus for detecting and tracking a ball in a multi-camera architecture in real-time comprising means for simultaneously performing one of a detection scheme or a tracking scheme on a frame from each of a plurality of real-time videos captured from at least twelve high-resolution cameras to detect a ball used in a sports event; and means for performing a multi-camera build to determine a location of the ball in 3D (3-Dimensions) for the frame from each of the plurality of real-time videos using one of detection or tracking results for each camera.

Example 26 may include the apparatus of example 25, wherein the detection scheme comprises means for retrieving the frame for each of the cameras; means for retrieving a background image from each of the cameras; means for removing the background image from the frame to obtain a foreground mask for each of the cameras; means for partitioning the foreground mask into tiles to obtain a partitioned foreground mask for each of the cameras; means for performing motion filtering on the partitioned foreground mask to obtain a motion filtered foreground mask for each of the cameras; means for performing detection of the ball for each tile in the frame of the motion filtered foreground mask that indicates motion is occurring for each of the cameras; and means for collecting detection results from all of the tiles in the frame for each of the cameras.

Example 27 may include the apparatus of example 25, wherein the tracking scheme comprises means for performing tracking-by-detection when the ball was detected in a previous frame, wherein tracking-by-detection comprises means for only performing detection on a single tile, the single tile being set using a ball center of the previous frame in which the ball was detected or tracked as a tile center for the single tile.

Example 28 may include the apparatus of any of examples 26-27, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 29 may include the apparatus of example 25, wherein the multi-camera build comprises means for performing a multi-camera cross validation, the multi-camera cross validation includes means for sampling the detection results from a set of cameras, wherein the set of cameras are selected using random sampling; and means for calculating a matching error along an epipolar line for the set of cameras randomly selected; when the matching error is equal to or greater than a predetermined threshold, a miss or false detection has occurred, the multi-camera build further includes means for repeating the multi-camera cross validation instructions until the matching error is less than the predetermined threshold; and when the matching error is less than the predetermined threshold, the multi-camera build further includes means for determining a 3D ball location using the sample cameras, means for re-projecting the 3D ball location onto each camera, and means for determining a distance between a detected position of the ball and a re-projection position of the ball for each camera, wherein if the distance is less than a pre-determined threshold, the results from the detection of the ball are correct using the set of cameras, wherein the multi-camera build further includes means for placing the set of cameras on an inner list and applying bundle adjustment to get an optimized 3D ball location.

Example 30 may include the apparatus of example 29, wherein the multi-camera build further includes means for repeating all of the multi-camera build method N times to obtain an optimal result with minimal re-project error.

Example 31 may include the apparatus of example 25, wherein when the multi-camera build is successful, using the tracking scheme in the next frame of each of the real-time videos to locate the ball; and wherein when the multi-camera build is unsuccessful, using the detection scheme in the next frame of each of the real-time videos to locate the ball.

Example 32 may include the apparatus of example 25, further comprising means for projecting the 3D ball location onto each of the results of the plurality of cameras in 2D (2-Dimensions); means for performing the detection around a projected position to obtain a more accurate location of the ball for the frame from each of the cameras; and means for continuously advancing each of the plurality of real-time videos to a next frame to repeat determining the location of the ball for the next frame until the plurality of real-time videos end.

Example 33 may include at least one computer readable medium, comprising a set of instructions, which when executed by one or more computing devices, cause the one or more computing devices to simultaneously perform one of a detection scheme or a tracking scheme on a frame from each of a plurality of real-time videos captured from at least twelve high-resolution cameras to detect a ball used in a sports event; and perform a multi-camera build to determine a location of the ball in 3D (3-Dimension) for the frame from each of the plurality of real-time videos using one of detection or tracking results for each of the cameras.

Example 34 may include the at least one computer readable medium of example 33, wherein the detection scheme includes instructions, which when executed by the one or more computing devices, cause the one or more computing devices to retrieve the frame for each of the cameras; retrieve a background image from each of the cameras; remove the background image from the frame to obtain a foreground mask for each of the cameras; partition the foreground mask into tiles to obtain a partitioned foreground mask for each of the cameras; perform motion filtering on the partitioned foreground mask to obtain a motion filtered foreground mask for each of the cameras; perform detection of the ball for each tile in the frame of the motion filtered foreground mask that indicates motion is occurring for each of the cameras; and collect detection results from all of the tiles in the frame for each of the cameras.

Example 35 may include the at least one computer readable medium of example 33, wherein the tracking scheme includes instructions, which when executed by the one or more computing devices, cause the one or more computing devices to perform tracking-by-detection when the ball was detected in a previous frame, wherein instructions to perform tracking-by-detection further comprise instructions to only perform detection on a single tile, the single tile being set using a ball center of the previous frame in which the ball was detected or tracked as a tile center for the single tile.

Example 36 may include the at least one computer readable medium of any of examples 34-35, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 37 may include the at least one computer readable medium of example 33, wherein the multi-camera build includes instructions, which when executed by the one or more computing devices, cause the one or more computing devices to perform a multi-camera cross validation, the multi-camera cross validation including logic to sample the detection results from a set of cameras, wherein the set of cameras are selected using a random sampling method; and calculate a matching error along an epipolar line for the set of cameras randomly selected; wherein when the matching error is equal to or greater than a predetermined threshold, a miss or false detection has occurred, the logic coupled to the substrate further includes logic to repeat the multi-camera cross validation instructions until the matching error is less than the predetermined threshold; and wherein when the matching error is less than the predetermined threshold, multi-camera build logic further includes logic to determine a 3D ball location using the sample cameras, re-project the 3D ball location onto each camera, and determine a distance between a detected position of the ball and a re-projection position of the ball for each camera, wherein if the distance is less than a pre-determined threshold, the results from the detection of the ball are correct using the set of cameras, wherein the multi-camera build logic further includes logic to place the set of cameras on an inner list and apply bundle adjustment to get an optimized 3D ball location.

Example 38 may include the at least one computer readable medium of example 37, wherein the multi-camera build further includes instructions, which when executed by the one or more computing devices, cause the one or more computing devices to repeat all of the multi-camera build logic N times to obtain an optimal result with minimal re-project error.

Example 39 may include the at least one computer readable medium of example 33, wherein when the multi-camera build is successful, the tracking scheme is used in the next frame of each of the real-time videos to locate the ball; and wherein when the multi-camera build is unsuccessful, the detection scheme is used in the next frame of each of the real-time videos to locate the ball.

Example 40 may include the at least one computer readable medium of example 33, further comprising instructions, which when executed by the one or more computing devices, cause the one or more computing devices to project the 3d ball location onto each of the results of the plurality of cameras in 2D (2-Dimensions); perform the detection around a projected position to obtain a more accurate location of the ball for the frame from each of the cameras; and continuously advance each of the plurality of real-time videos to a next frame to repeat the logic to determine the location of the ball for the next frame until the plurality of real-time videos end.

Example 41 may include the multi-camera architecture of example 1, wherein the plurality of high-resolution cameras comprises twelve (12) high-resolution cameras, wherein at least three (3) of the 12 high-resolution cameras capture every pixel in the entire playing field.

Example 42 may include the multi-camera architecture of example 2, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 43 may include the multi-camera architecture of example 3, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 44 may include the apparatus of example 10, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 45 may include the apparatus of example 11, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 46 may include the method of example 18, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 47 may include the method of example 19, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 48 may include the apparatus of example 26, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 49 may include the apparatus of example 27, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 50 may include the at least one computer readable medium of example 34, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Example 51 may include the at least one computer readable medium of example 35, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A multi-camera architecture, comprising:
   network interface circuitry to receive a plurality of real-time videos taken from a plurality of high-resolution cameras, each of the high-resolution cameras simultaneously capturing a sports event, wherein each of the plurality of high-resolution cameras includes a viewpoint that covers an entire playing field where the sports event is played;
   one or more processors coupled to the network interface circuitry;
   one or more memory devices coupled to the one or more processors, the one or more memory devices including instructions to determine a location of a ball for each frame of the plurality of real-time videos, which when executed by the one or more processors, cause the multi-camera architecture to:
   simultaneously perform one of a detection scheme or a tracking scheme on a frame from each of the plurality of real-time videos to detect the ball used in the sports event; and perform a multi-camera build to determine the location of the ball in 3D (3-Dimensions) for the frame from each of the plurality of real-time videos using one of detection or tracking results for each camera;
wherein the tracking scheme comprises instructions, that when executed by the one or more processors, cause the multi-camera architecture to perform tracking-by-detection when the ball was detected in a previous frame, wherein instructions to perform tracking-by-detection further comprise instructions to only perform detection on a single tile, the single tile being set using a ball center of the previous frame in which the ball was detected or tracked as a tile center for the single tile.

2. The multi-camera architecture of claim 1, wherein the detection scheme comprises instructions, which when executed by the one or more processors, cause the multi-camera architecture to:
retrieve the frame for each of the cameras;
retrieve a background image from each of the cameras;
remove the background image from the frame to obtain a foreground mask for each of the cameras;
partition the foreground mask into tiles to obtain a partitioned foreground mask for each of the cameras;
perform motion filtering on the partitioned foreground mask to obtain a motion filtered foreground mask for each of the cameras;
perform detection of the ball for each tile in the frame of the motion filtered foreground mask that indicates motion is occurring for each of the cameras; and
collect detection results from all of the tiles in the frame for each of the cameras.

3. The multi-camera architecture of claim 2, wherein detection includes detection of the ball using one of YOLO (You Only Look Once), Faster RCNN (Faster Region-based Convolutional Neural Network), SSD (Single Shot Multi-Box Detector), and any other object detection technique used to detect small objects.

4. The multi-camera architecture of claim 1, wherein detection includes detection of the ball using one of YOLO (You Only Look Once), Faster RCNN (Faster Region-based Convolutional Neural Network), SSD (Single Shot Multi-Box Detector), and any other object detection technique used to detect small objects.

5. The multi-camera architecture of claim 1, wherein the multi-camera build comprises instructions, that when executed by the one or more processors, cause the multi-camera architecture to:
perform a multi-camera cross validation, the multi-camera cross validation including instructions to sample the detection results from a set of cameras, wherein the set of cameras are selected using a random sampling method; and calculate a matching error along an epipolar line for the set of cameras randomly selected;
when the matching error is equal to or greater than a predetermined threshold, a miss or false detection has occurred, wherein instructions further comprise to repeat the multi-camera cross validation instructions until the matching error is less than the predetermined threshold; and
when the matching error is less than the predetermined threshold, multi-camera build instructions further comprise instructions to determine a 3D ball location using the sample cameras, re-project the 3D ball location onto each of the cameras, and determine a distance between a detected position of the ball and a re-projection position of the ball for each of the cameras, wherein if the distance is less than a pre-determined threshold, the results from the detection of the ball are correct using the set of cameras, wherein the multi-camera build instructions further comprise instructions to place the set of cameras on an inner list and apply bundle adjustment to get an optimized 3D ball location.

6. The multi-camera architecture of claim 5, wherein the multi-camera build further comprises instructions to repeat all of the multi-camera build instructions N times to obtain an optimal result with minimal re-project error.

7. The multi-camera architecture of claim 1, wherein when the multi-camera build is successful, the tracking scheme is used in the next frame of each of the videos to locate the ball; and wherein when the multi-camera build is unsuccessful, the detection scheme is used in the next frame of each of the videos to locate the ball.

8. The multi-camera architecture of claim 1, wherein further instructions, which when executed by the one or more processors, cause the multi-camera architecture to:
project the 3d ball location onto each of the results of the plurality of cameras in 2D (2-Dimensions);
perform the detection around a projected position to obtain a more accurate location of the ball for the frame from each of the cameras; and
continuously advance each of the plurality of real-time videos to a next frame to repeat the instructions to determine the location of the ball for the next frame until the plurality of real-time videos end.

9. The multi-camera architecture of claim 1, wherein the plurality of high-resolution cameras comprises twelve (12) high-resolution cameras, wherein at least three (3) of the 12 high-resolution cameras capture every pixel in the entire playing field.

10. A method comprising:
simultaneously performing one of a detection scheme or a tracking scheme on a frame from each of a plurality of videos captured from at least twelve high-resolution cameras to detect a ball used in a sports event; and
performing a multi-camera build to determine a location of the ball in 3D (3-Dimensions) for the frame from each of the plurality of videos using one of detection or tracking results for each camera;
wherein the tracking scheme comprises performing tracking-by-detection when the ball was detected in a previous frame, wherein tracking-by-detection comprises only performing detection on a single tile, the single tile being set using a ball center of the previous frame in which the ball was detected or tracked as a tile center for the single tile.

11. The method of claim 10, wherein the detection scheme comprises:
retrieving the frame for each of the cameras;
retrieving a background image from each of the cameras;
removing the background image from the frame to obtain a foreground mask for each of the cameras;
partitioning the foreground mask into tiles to obtain a partitioned foreground mask for each of the cameras;
performing motion filtering on the partitioned foreground mask to obtain a motion filtered foreground mask for each of the cameras;
performing detection of the ball for each tile in the frame of the motion filtered foreground mask that indicates motion is occurring for each of the cameras; and
collecting detection results from all of the tiles in the frame for each of the cameras.

12. The method of claim 10, wherein the multi-camera build comprises:
performing a multi-camera cross validation, the multi-camera cross validation includes sampling the detection results from a set of cameras, wherein the set of cameras are selected using random sampling; and calculating a matching error along an epipolar line for the set of cameras randomly selected;
when the matching error is equal to or greater than a predetermined threshold, a miss or false detection has occurred, the multi-camera build further includes repeating the multi-camera cross validation instructions until the matching error is less than the predetermined threshold; and
when the matching error is less than the predetermined threshold, the multi-camera build further includes determining a 3D ball location using the sample cameras, re-projecting the 3D ball location onto each camera, and determining a distance between a detected position of the ball and a re-projection position of the ball for each camera, wherein if the distance is less than a pre-determined threshold, the results from the detection of the ball are correct using the set of cameras, wherein the multi-camera build further includes placing the set of cameras on an inner list and applying bundle adjustment to get an optimized 3D ball location.

13. The method of claim 12, wherein the multi-camera build further includes repeating all of the multi-camera build method N times to obtain an optimal result with minimal re-project error.

14. The method of claim 10, wherein when the multi-camera build is successful, using the tracking scheme in the next frame of each of the videos to locate the ball; and wherein when the multi-camera build is unsuccessful, using the detection scheme in the next frame of each of the videos to locate the ball.

15. The method of claim 10, further comprising:
projecting the 3D ball location onto each of the results of the plurality of cameras in 2D (2-Dimensions);
performing the detection around a projected position to obtain a more accurate location of the ball for the frame from each of the cameras; and
continuously advancing each of the plurality of real-time videos to a next frame to repeat determining the location of the ball for the next frame until the plurality of real-time videos end.

16. At least one non-transitory computer readable medium, comprising a set of instructions, which when executed by one or more computing devices, cause the one or more computing devices to:
simultaneously perform one of a detection scheme or a tracking scheme on a frame from each of a plurality of real-time videos captured from at least twelve high-resolution cameras to detect a ball used in a sports event; and
perform a multi-camera build to determine a location of the ball in 3D (3-Dimension) for the frame from each of the plurality of real-time videos using one of detection or tracking results for each of the cameras;
wherein the tracking scheme includes instructions, which when executed by the one or more computing devices, cause the one or more computing devices to perform tracking-by-detection when the ball was detected in a previous frame, wherein instructions to perform tracking-by-detection further comprise instructions to only perform detection on a single tile, the single tile being set using a ball center of the previous frame in which the ball was detected or tracked as a tile center for the single tile.

17. The at least one non-transitory computer readable medium of claim 16, wherein the detection scheme includes instructions, which when executed by the one or more computing devices, cause the one or more computing devices to:
retrieve the frame for each of the cameras;
retrieve a background image from each of the cameras;
remove the background image from the frame to obtain a foreground mask for each of the cameras;
partition the foreground mask into tiles to obtain a partitioned foreground mask for each of the cameras;
perform motion filtering on the partitioned foreground mask to obtain a motion filtered foreground mask for each of the cameras;
perform detection of the ball for each tile in the frame of the motion filtered foreground mask that indicates motion is occurring for each of the cameras; and
collect detection results from all of the tiles in the frame for each of the cameras.

18. The at least one non-transitory computer readable medium of claim 17, wherein detection includes detection of the ball using one of YOLO (You Only Look Once), Faster RCNN (Faster Region-based Convolutional Neural Network), SSD (Single Shot MultiBox Detector), and any other object detection technique used to detect small objects.

19. The at least one non-transitory computer readable medium of claim 16, wherein the multi-camera build includes instructions, which when executed by the one or more computing devices, cause the one or more computing devices to:
perform a multi-camera cross validation, the multi-camera cross validation including logic to sample the detection results from a set of cameras, wherein the set of cameras are selected using a random sampling method; and calculate a matching error along an epipolar line for the set of cameras randomly selected;
wherein when the matching error is equal to or greater than a predetermined threshold, a miss or false detection has occurred, the logic coupled to the substrate further includes logic to repeat the multi-camera cross validation instructions until the matching error is less than the predetermined threshold; and
wherein when the matching error is less than the predetermined threshold, multi-camera build logic further includes logic to determine a 3D ball location using the sample cameras, re-project the 3D ball location onto each camera, and determine a distance between a detected position of the ball and a re-projection position of the ball for each camera, wherein if the distance is less than a pre-determined threshold, the results from the detection of the ball are correct using the set of cameras, wherein the multi-camera build logic further includes logic to place the set of cameras on an inner list and apply bundle adjustment to get an optimized 3D ball location.

20. The at least one non-transitory computer readable medium of claim 19, wherein the multi-camera build further includes instructions, which when executed by the one or more computing devices, cause the one or more computing devices to repeat all of the multi-camera build logic N times to obtain an optimal result with minimal re-project error.

21. The at least one non-transitory computer readable medium of claim 16, wherein when the multi-camera build is successful, the tracking scheme is used in the next frame of each of the real-time videos to locate the ball; and wherein when the multi-camera build is unsuccessful, the detection scheme is used in the next frame of each of the real-time videos to locate the ball.

22. The at least one non-transitory computer readable medium of claim 16, further comprising instructions, which when executed by the one or more computing devices, cause the one or more computing devices to:
project the 3d ball location onto each of the results of the plurality of cameras in 2D (2-Dimensions);
perform the detection around a projected position to obtain a more accurate location of the ball for the frame from each of the cameras; and
continuously advance each of the plurality of real-time videos to a next frame to repeat the logic to determine the location of the ball for the next frame until the plurality of real-time videos end.

* * * * *